United States Patent
Wei

[19]

[11] Patent Number: 6,097,300
[45] Date of Patent: Aug. 1, 2000

[54] MULTIFUNCTIONAL SENSING AND CONTROL ASSEMBLY

[76] Inventor: Jung-Tsung Wei, 58, Ma Yuan West St., Taichung, Taiwan

[21] Appl. No.: 09/371,879

[22] Filed: Aug. 8, 1999

[51] Int. Cl.[7] .................................................. G08B 23/00
[52] U.S. Cl. .................. 340/693.5; 340/541; 340/573.2; 340/573.1
[58] Field of Search ................................ 340/693.5, 540, 340/541, 555, 573.2, 601, 573.1

[56] References Cited

U.S. PATENT DOCUMENTS

| | | | |
|---|---|---|---|
| 5,132,659 | 7/1992 | Kuo | 340/326 |
| 5,463,595 | 10/1995 | Rodhall et al. | 367/93 |
| 5,625,348 | 4/1997 | Farnsworth et al. | 340/690 |
| 5,644,300 | 7/1997 | Lin | 340/690 |
| 5,839,821 | 11/1998 | LeZotte | 362/253 |
| 5,867,099 | 2/1999 | Keeter | 340/567 |
| 5,912,626 | 6/1999 | Soderlund | 340/693.5 |
| 5,949,338 | 9/1999 | Masi et al. | 340/573.1 |
| 5,969,627 | 10/1999 | Tarlton et al. | 340/693.12 |

*Primary Examiner*—Jeffery A. Hofsass
*Assistant Examiner*—Sihong Huang

[57] ABSTRACT

A multifunctional sensing and control assembly has a hollow main casing, a control device disposed in the hollow main casing, a cover plate disposed on a front portion of the hollow main casing, and a lamp casing disposed on an upper portion of the hollow main casing. The hollow main casing has a chamber receiving cells, an inner block having two slots, a first upper notch, a plurality of positioning apertures, two lower oblong apertures, and two upper click hooks. The cover plate has a second upper notch, a plurality of lateral click hooks, a round opening, and a through aperture. The control device has an electric circuit board, a control board, and a horn inserted in the round opening.

3 Claims, 5 Drawing Sheets

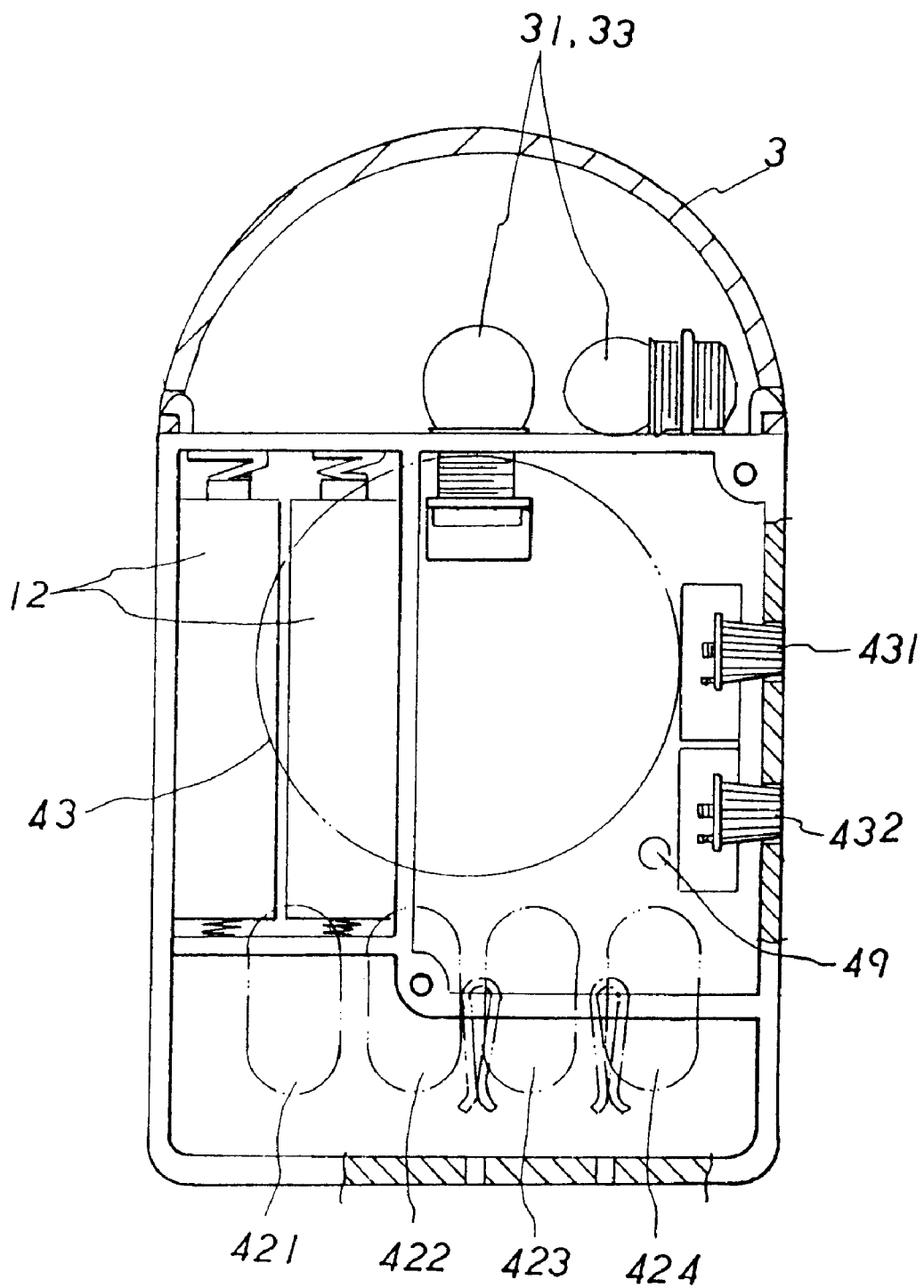
F I G. 2

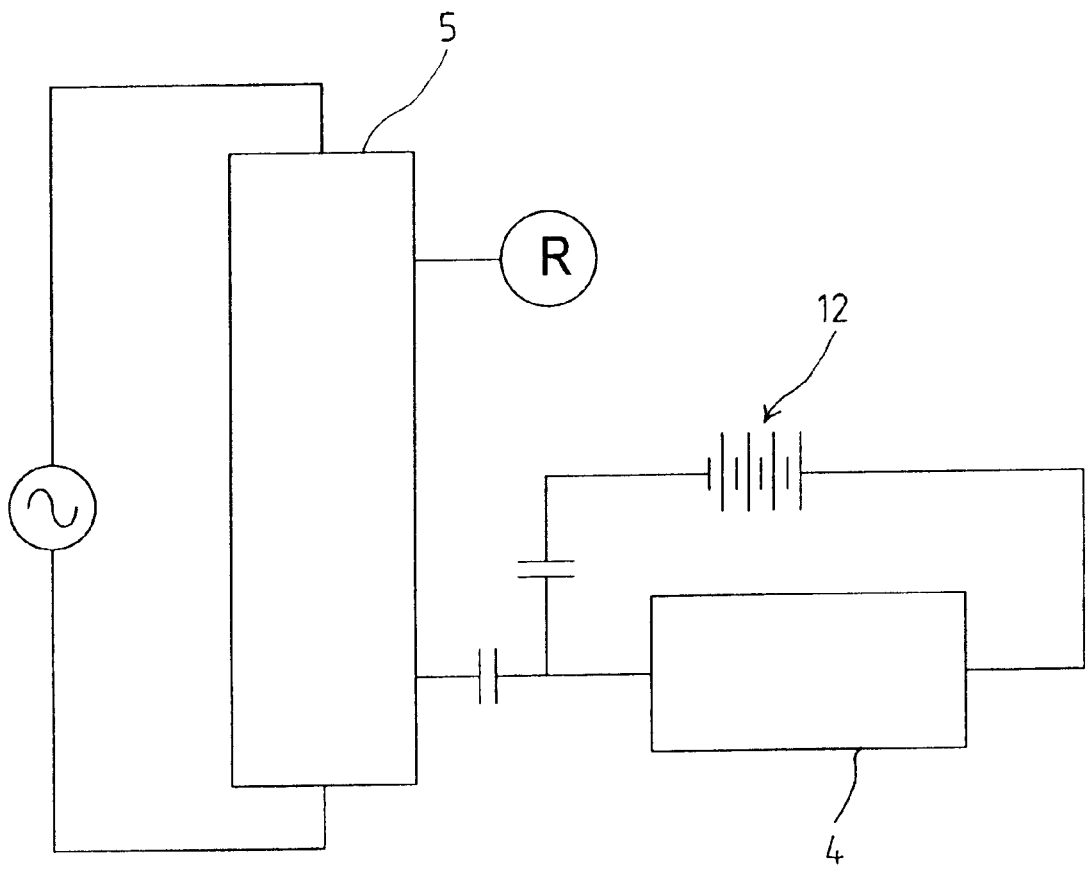
F I G. 4

6,097,300

MULTIFUNCTIONAL SENSING AND CONTROL ASSEMBLY

BACKGROUND OF THE INVENTION

The present invention relates to a multifunctional sensing and control assembly. More particularly, the present invention relates to a multifunctional sensing and control assembly which is portable.

A conventional emergency lamp is an individual device. A shock sensing device can detect a seismic wave. However, it is difficult to combine an emergency lamp, a shock sensing device, and an infrared sensing device together.

SUMMARY OF THE INVENTION

An object of the present invention is to provide a multifunctional sensing and control assembly which is portable.

Another object of the present invention is to provide a multifunctional sensing and control assembly which can sense an infrared frequency.

Another object of the present invention is to provide a multifunctional sensing and control assembly which can detect a shock wave.

Another object of the present invention is to provide a multifunctional sensing and control assembly which can illuminate a lamp while the electricity is disconnected.

Another object of the present invention is to provide a multifunctional sensing and control assembly which can expel insects.

Accordingly, a multifunctional sensing and control assembly comprises a hollow main casing, a control device disposed in the hollow main casing, a cover plate disposed on a front portion of the hollow main casing, and a transparent lamp casing disposed on an upper portion of the hollow main casing. The hollow main casing has a chamber receiving a plurality of cells, an inner block having two slots, a first upper notch, a round hole, a circular hole, a plurality of positioning apertures, two lower oblong apertures, and two upper click hooks. The cover plate has a second upper notch, a plurality of lateral click hooks inserted in the positioning apertures, a round opening, a first oblong hole, a second oblong hole, a third oblong hole, a fourth oblong hole, and a through aperture. The transparent lamp casing has two click grooves receiving the upper click hooks. The control device has an electric circuit board disposed in the hollow main casing, a control board disposed on the cover plate, a horn inserted in the round opening, a shock sensitivity adjustment button disposed on the electric circuit board, an insect expelling frequency adjustment button disposed on the electric circuit board, a copper seat disposed on the electric circuit board, two copper plates disposed on the electric circuit board and inserted in the slots, two elastic conductive plates inserted in the lower oblong apertures, and an infrared sensor inserted in the through aperture. The control board has a lighting button switch inserted in the first oblong hole, an insect expelling button switch inserted in the second oblong hole, an alarm button switch inserted in the third oblong hole, and an infrared button switch inserted in the fourth oblong hole.

BRIEF DESCRIPTION OF THE DRAWINGS

FIG. 2 is a sectional assembly view of a multifunctional sensing and control assembly of a preferred embodiment;

FIG. 4 is a schematic diagram illustrating a control of a power source; and

DETAILED DESCRIPTION OF THE INVENTION

Figure 1:
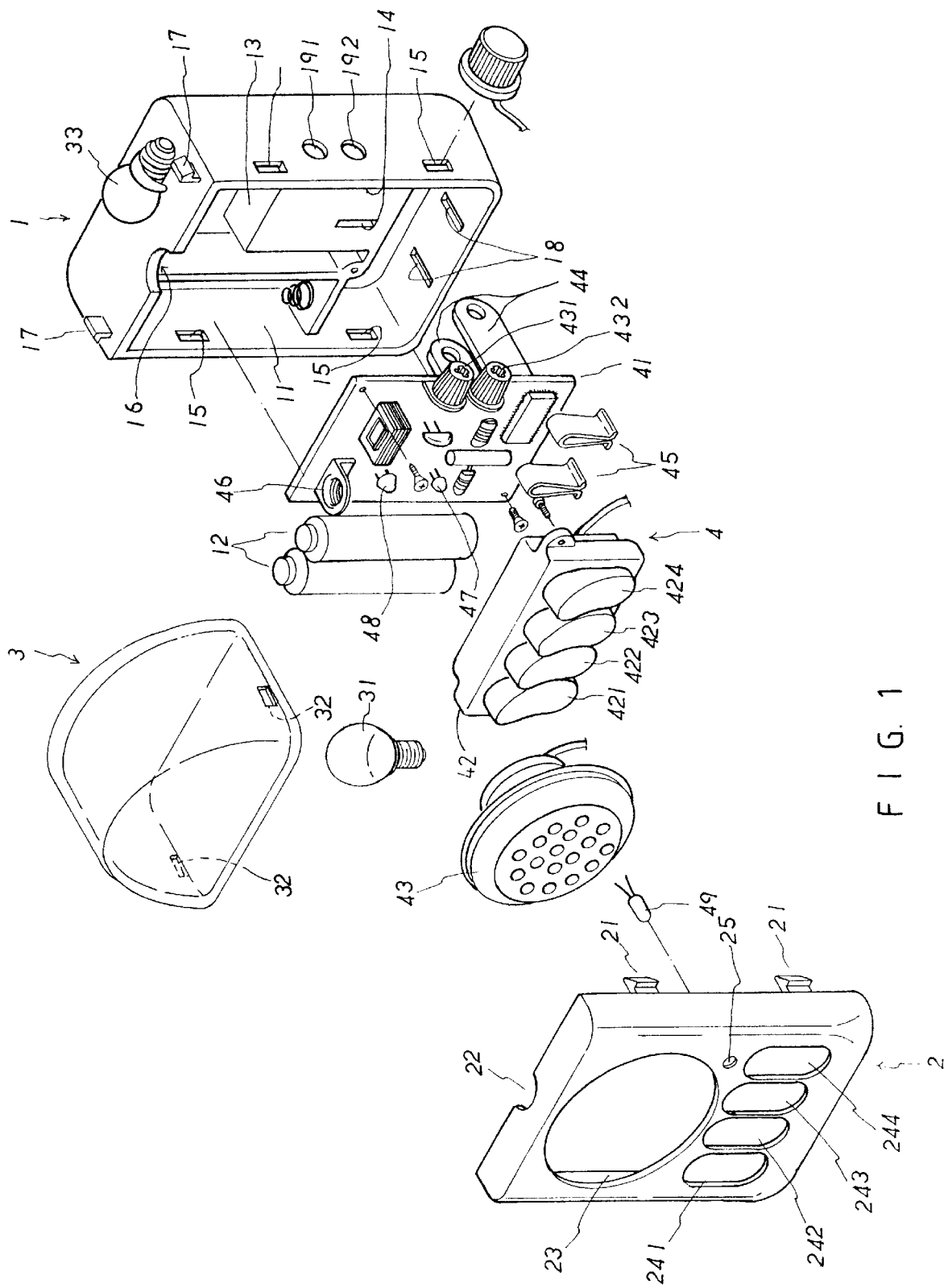
FIG. 1 is a perspective exploded view of a multifunctional sensing and control assembly of a preferred embodiment.
Figure 3:
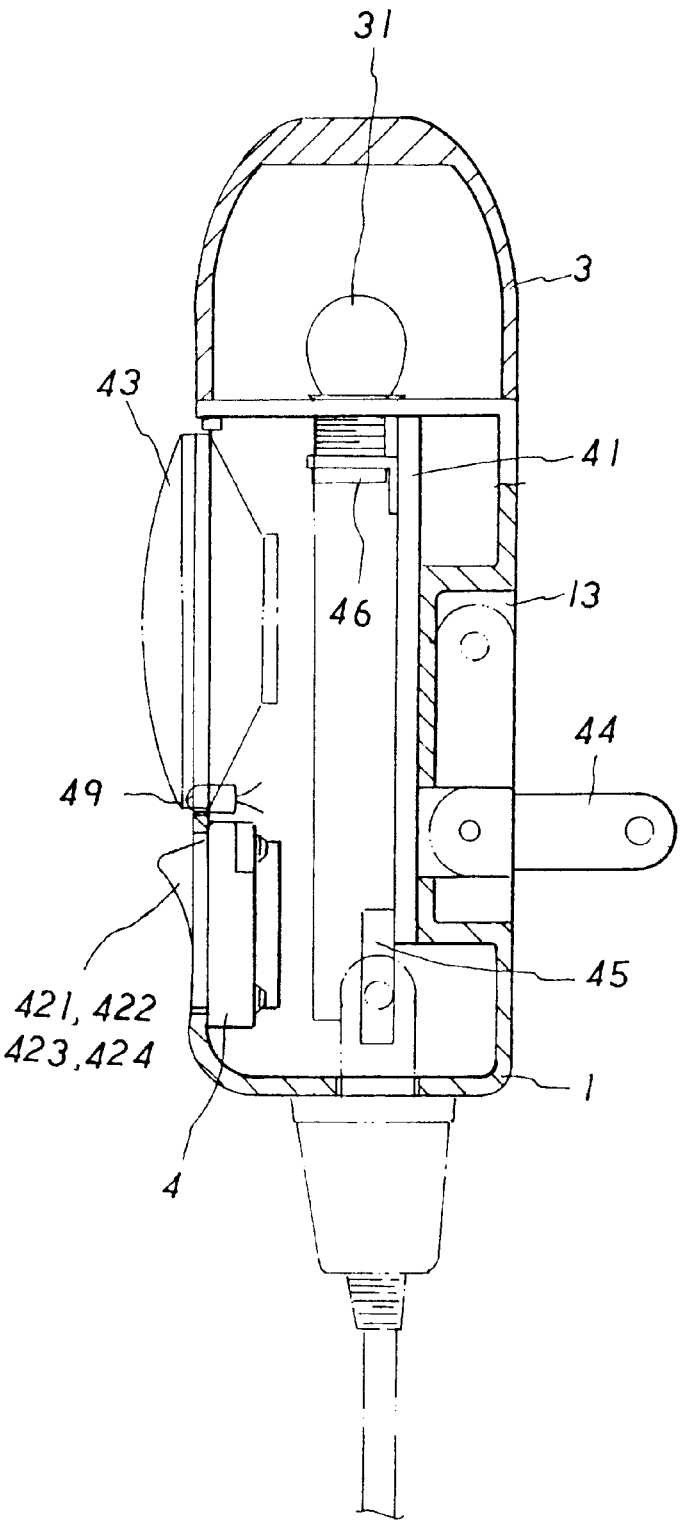
FIG. 3 is another sectional assembly view of a multifunctional sensing and control assembly of a preferred embodiment.
Figure 5:
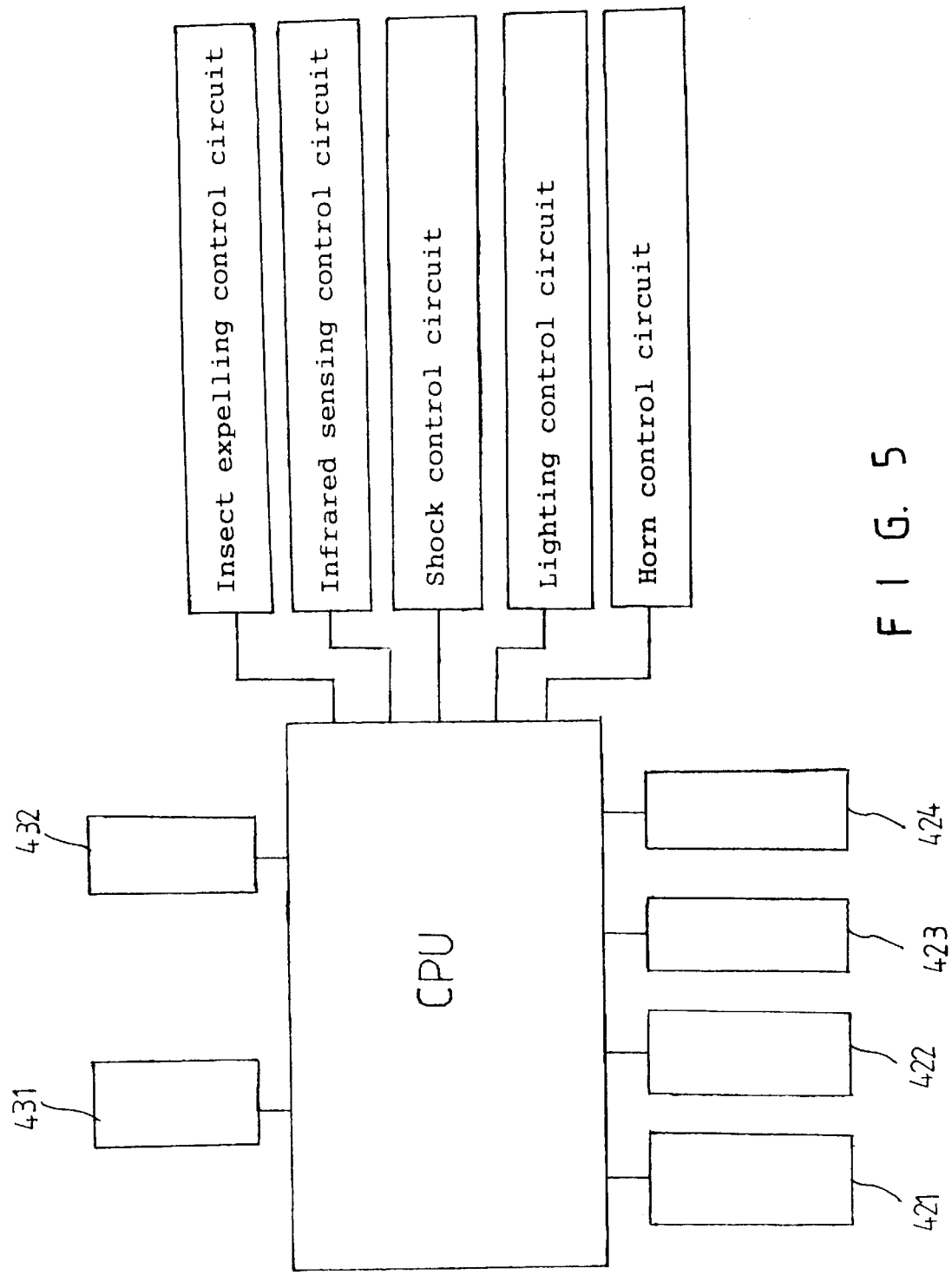
FIG. 5 is a schematic diagram illustrating a central processing unit controlling various electric circuits.

Referring to FIGS. 1 to 5, a multifunctional sensing and control assembly comprises a hollow main casing 1, a control device 4 disposed in the hollow main casing 1, a cover plate 2 disposed on a front portion of the hollow main casing 1, and a transparent lamp casing 3 disposed on an upper portion of the hollow main casing 1.

The hollow main casing 1 has a chamber 11 receiving a plurality of cells 12, an inner block 13 having two slots 14, a first upper notch 16, a round hole 191, a circular hole 192, a plurality of positioning apertures 15, two lower oblong apertures 18, and two upper click hooks 17.

The cover plate 2 has a second upper notch 22, a plurality of lateral click hooks 21 inserted in the positioning apertures 15, a round opening 23, a first oblong hole 241, a second oblong hole 242, a third oblong hole 243, a fourth oblong hole 244, and a through aperture 25.

The transparent lamp casing 3 has two click grooves 32 receiving the upper click hooks 17.

The control device 4 has an electric circuit board 41 disposed in the hollow main casing 1, a control board 42 disposed on the cover plate 2, a horn 43 inserted in the round opening 23, a shock sensitivity adjustment button 431 disposed on the electric circuit board 41, an insect expelling frequency adjustment button 432 disposed on the electric circuit board 41, a copper seat 46 disposed on the electric circuit board 41, two copper plates 44 disposed on the electric circuit board 41 and inserted in the slots 14, two elastic conductive plates 45 inserted in the lower oblong apertures 18, and an infrared sensor 49 inserted in the through aperture 25.

The control board 42 has a lighting button switch 421 inserted in the first oblong hole 241, an insect expelling button switch 422 inserted in the second oblong hole 242, an alarm button switch 423 inserted in the third oblong hole 243, and an infrared button switch 424 inserted in the fourth oblong hole 244.

The electric circuit board 41 has a central processing unit (CPU), a shock sensor 47, a high frequency producer 48, a horn control circuit, a lighting control circuit, a shock control circuit, an insect expelling control circuit, an infrared sensing control circuit, and a transformer rectification control circuit 5 connected to a relay R, the cells 12, and an alternative current power source.

The central processing unit (CPU) is connected to the lighting button switch 421, the insect expelling button switch 422, the alarm button switch 423, the infrared button switch 424, the shock sensitivity adjustment button 431, and the insect expelling frequency adjustment button 432.

The shock sensor 47 is connected to the shock control circuit. The shock sensitivity adjustment button 431 can be rotated to adjust the shock sensitivity of the shock sensor 47. For example, the shock sensor 47 can sense a seismic wave or an impact while the multifunctional sensing and control assembly falls down.

The high frequency producer 48 is connected to the insect expelling control circuit. The insect expelling frequency adjustment button 432 can be rotated to adjust the frequency of the high frequency producer 48 in order to repel mosquitoes or cockroaches.

The infrared sensor 49 is connected to the infrared sensing control circuit. The infrared sensor 49 emits a signal forward, the signal will reflect backward while the signal touches a moving article. The horn 43 is connected to the horn control circuit. The infrared sensor 49 will send another signal into the central processing unit (CPU) and the central processing unit (CPU) actuates the horn control circuit so that the horn 43 will alarm.

The elastic conductive plates 45 engage with two blades of a plug.

The shock sensitivity adjustment button 431 is inserted through the round hole 191. The insect expelling frequency adjustment button 432 is inserted through the circular hole 192.

A first lamp 31 is disposed on the copper seat 46. The first lamp 31 is inserted through the first upper notch 16 and the second upper notch 22.

A second lamp 33 is disposed on a top portion of the hollow main casing 1.

The invention is not limited to the above embodiment but various modification thereof may be made. Further, various changes in form and detail may be made without departing from the scope of the invention.

I claim:

1. A multifunctional sensing and control assembly comprising:

a hollow main casing, a control device disposed in the hollow main casing, a cover plate disposed on a front portion of the hollow main casing, a transparent lamp casing disposed on an upper portion of the hollow main casing, the hollow main casing having a chamber receiving a plurality of cells, an inner block having two slots, a first upper notch, a round hole, a circular hole, a plurality of positioning apertures, two lower oblong apertures, and two upper click hooks, the cover plate having a second upper notch, a plurality of lateral click hooks inserted in the positioning apertures, a round opening, a first oblong hole, a second oblong hole, a third oblong hole, a fourth oblong hole, and a through aperture, the transparent lamp casing having two click grooves receiving the upper click hooks 17, the control device having an electric circuit board disposed in the hollow main casing, a control board disposed on the cover plate, a horn inserted in the round opening, a shock sensitivity adjustment button disposed on the electric circuit board, an insect expelling frequency adjustment button disposed on the electric circuit board, a copper seat disposed on the electric circuit board, two copper plates disposed on the electric circuit board and inserted in the slots, two elastic conductive plates inserted in the lower oblong apertures, and an infrared sensor inserted in the through aperture, and the control board having a lighting button switch inserted in the first oblong hole, an insect expelling button switch inserted in the second oblong hole, an alarm button switch inserted in the third oblong hole, and an infrared button switch inserted in the fourth oblong hole.

2. The multifunctional sensing and control assembly as claimed in claim 1, wherein the electric circuit board has a central processing unit, a shock sensor, a high frequency producer, a horn control circuit, a lighting control circuit, a shock control circuit, an insect expelling control circuit, an infrared sensing control circuit, and a transformer rectification control circuit connected to a relay, the cells, and an alternative current power source, the central processing unit is connected to the lighting button switch, the insect expelling button switch, the alarm button switch, the infrared button switch, the shock sensitivity adjustment button, and the insect expelling frequency adjustment button, the shock sensor is connected to the shock control circuit, the high frequency producer is connected to the insect expelling control circuit, the infrared sensor is connected to the infrared sensing control circuit, and the horn is connected to the horn control circuit.

3. The multifunctional sensing and control assembly as claimed in claim 1, wherein the lamp is disposed on the copper seat, and the lamp is inserted through the first upper notch and the second upper notch.

* * * * *